United States Patent
Rugel

(10) Patent No.: US 8,526,449 B2
(45) Date of Patent: Sep. 3, 2013

(54) APPARATUS FOR CONTROLLING DATA TRAFFIC AND A METHOD FOR MEASURING QOE

(75) Inventor: Stefan Rugel, Munich (DE)

(73) Assignee: Telefonica Germany GmbH & OHG, Munich (DE)

( * ) Notice: Subject to any disclaimer, the term of this patent is extended or adjusted under 35 U.S.C. 154(b) by 197 days.

(21) Appl. No.: 13/287,763

(22) Filed: Nov. 2, 2011

(65) Prior Publication Data
US 2013/0044597 A1     Feb. 21, 2013

(30) Foreign Application Priority Data
Nov. 2, 2010   (EP) ..................................... 10014208

(51) Int. Cl.
*H04L 12/28* (2006.01)
(52) U.S. Cl.
USPC ........... 370/401; 370/252; 370/229; 370/235; 370/338; 370/352
(58) Field of Classification Search
None
See application file for complete search history.

(56) References Cited

U.S. PATENT DOCUMENTS

| | | | | |
|---|---|---|---|---|
| 8,467,412 | B2 * | 6/2013 | Alexander | 370/468 |
| 2007/0025301 | A1 * | 2/2007 | Petersson et al. | 370/338 |
| 2007/0258418 | A1 * | 11/2007 | Wurtenberger et al. | 370/338 |
| 2012/0117225 | A1 * | 5/2012 | Kordasiewicz et al. | 709/224 |

FOREIGN PATENT DOCUMENTS

| | | |
|---|---|---|
| EP | 2244426 A1 | 10/2010 |
| WO | WO2005022852 | 3/2005 |

* cited by examiner

*Primary Examiner* — Duc C Ho
(74) *Attorney, Agent, or Firm* — Mark D. Bowen; Malin Haley DiMaggio & Bowen, P.A.

(57) ABSTRACT

The present invention refers to an apparatus for controlling data traffic in a cell of a cellular network wherein the apparatus comprises means for determining the data rate of an ongoing data session established between a first client device located in a cell and a network device wherein said data session is used for receiving streaming data, means for determining the data rate of an ongoing data session established between a second client device located in the same cell and a network device wherein said data session is used for receiving non streaming data, means for determining a Quality of Experience of the data stream of the first client device and means for adjusting the data rate of the first and/or second client device if the determined Quality of Experience of said data stream of the first client device is lower than a predetermined threshold.

18 Claims, 2 Drawing Sheets

Fig. 1

| File Extension | File Description | timing information | Reference | Remark |
|---|---|---|---|---|
| .3g2 | 3GPP2 Multimedia File | see .mp/ | /3g2-SPEC/ | |
| .3gp | 3GPP Multimedia File | see .mp4 | /3gp-SPEC/ | |
| .asf, .wma, .wmv | Advanced Systems Format | payload parsing information -> Send Time | /asf-SPEC/, 5.2.2 | |
| .flv | Flash Video File | FLVTAG -> Timestamp, FLVTAG -> Timestampextended | /f4v-SPEC/, E.4.1 | |
| .mov | Apple QuickTime Movie | time to sample atom -> sample count, time to sample atom -> sample duration | /mov-SPEC/, chapter 2 | |
| .mp4 | MPEG-4 Video File | Decoding Time to Sample Box ('stts') -> sample_delta, | /mp4-SPEC/, 8.15.2, 8.15.3 | |
| .mpg | MPEG Video File | presentation_time_stamp | /mpg-SPEC/, 2.4.4.3 | |
| .swf | Flash Movie | SWF File Header -> FrameRate | /swf-SPEC/, Chapter 2 | fixed frame rate, time interval between frames can be calculated by rate parameters |

APPARATUS FOR CONTROLLING DATA TRAFFIC AND A METHOD FOR MEASURING QOE

CROSS REFERENCE TO RELATED U.S. APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention refers to an apparatus for controlling the data traffic in a cell of a cellular network. The invention is further directed to a method for measuring the Quality of Experience of an ongoing data session in a communication system comprising client and server devices which are interconnected over a packet-switching data link. Furthermore, the invention is related to a video server for providing at least two video streams.

2. Description of Related Art

In today's mobile data networks, data streaming accounts for a major part of transmitted data volume which is expected to increase in the near future. In particular, applications which are based on video streaming enjoy increasing popularity. Typical services provide several video streams which are provided by designated video servers. Users can establish data sessions to said servers in order to play video streams at their specific client devices. However, these data sessions often require a higher bandwidth than voice services or other data services.

The increasing demand for streaming data, in particular video streaming, poses a great challenge to future network management. The quality of the offered streaming services often depends on the available data rate allocated to each subscriber by the network management. As the Internet and today's mobile data networks do not guarantee bitrates for the individual application, it can always happen that throughput is limited by network constraints down to a level which does not allow to transmit the video signals according to the playing rate which causes stalls of the video being watched by the user.

Therefore, one major function of network management is to assure a sufficient Quality of Experience, in the following referred to as QoE, of said streaming services. For example in voice or video applications the QoE stands for an available voice or video image quality. Hence, reliable measurement methods for live network data streaming are key parts of QoE measurements especially for mobile data applications.

A first intuitive approach could be to measure the perceived bandwidth of the individual video stream and compare this with the bandwidth required by the streaming application. This approach however lacks in precision: modern video codecs such as H.264 use variable bitrates coding so the actual bandwidth demand can only be estimated.

As is known from the prior art, Quality of Service, in the following referred to as QoS, standards provide methods for bandwidth allocation and service prioritisation. However, in current mobile cellular networks it is required to define these QoS parameters before establishing data sessions, in particular streaming sessions. Normally, these parameters are set in specified header fields of the used data packets. Changes of said parameters during live-network traffic are prohibited. Moreover, these parameters must be configured manually on the client device. Even if a mobile network would consider these QoS settings, they do not apply end-to-end, i.e. they may only apply for the air interface of a mobile network and not for the backbone or the part of the route in the Internet.

BRIEF SUMMARY OF THE INVENTION

It is a first object of the present invention to provide an apparatus for controlling data traffic in one or more cells of a cellular network which comprises more efficient better network management functions for ongoing data sessions.

It is a second object of the present invention to provide a reliable and improved measurement method for live-network streaming traffic in order to determine the Quality of Experience.

A third object of the present invention is to enhance a known video server according to video rate selection and management.

The first object is solved by an apparatus according to claim 1. According to the invention the apparatus comprises means for determining the data rate of an ongoing data session established between a first client device located in a cell and a network device wherein said data session is used for receiving streaming data. The network device can preferably be a video or audio streaming server which is either located in the cellular network topology of the network provider or located in the Internet.

Further, the apparatus comprises means for determining the data rate of an ongoing data session established between a second client device located in the same cell and a network device wherein said data session is used for receiving non streaming data. Both client devices can be connected to a single network device or to different devices. Both data sessions share the available bandwidth of a cell and do not obviously differ from each other in QoS parameters. In other words, both sessions have been established with identical QoS parameters. Data sessions for receiving non streaming data are preferably used for standard web surfing, data exchange, or other arbitrary services.

For monitoring the quality of the streaming session the apparatus comprises means for determining a Quality of Experience of the data stream of the first client device. As mentioned above, the Quality of Experience can preferably be a measurable value characterising the objective video image quality of a video stream or the objective voice/music quality of an audio stream depending on the available data rate or other respective connection parameters.

Lastly, the apparatus comprises means for adjusting the data rate of the first and/or second client device if the determined Quality of Experience of said data stream of the first client device is lower than a predetermined threshold. For example, stalls of the video stream are more likely if the Quality of Experience falls below the predetermined threshold.

For example, said means for adjusting the data rate could include decreasing the reserved data rate of the second client in case of too low Quality of Experience. The released bandwidth in the cell can now be used to increase the data rate of the first data session in order to improve the Quality of Experience.

With other words, the invention provides a special kind of QoS management for ongoing data sessions which have not explicitly been established with predefined QoS parameters. In contrary, prior art cellular networks have to define QoS parameters before opening data sessions for different applications in order to meet the respective QoS requirements. A modification of said parameters of an open session is prohibited.

In a preferred embodiment of the invention the means for adjusting the data rate are adapted to block and/or delay and/or discard one or more data packets of the respective data stream of the first and/or second client device. Blocking, delaying or discarding packets of the second data session could decrease its data rate and therefore increase the data rate of the first data session. Decreasing the data rate could include causing a video server to switch to a different profile of a video coding scheme or changing the video coding to a different standard, such as changing from H.264 to MP4.

It is further conceivable that the network is based on one or more of the standards GSM/GPRS/UMTS/LTE or other future standards. Further, the first and/or second client device (s) is/are mobile devices, e.g. mobile phones, smartphones, notebooks, or other known mobile devices.

The inventive apparatus is preferably a network controller, router or a similar network equipment device integrated in the network topology of the network provider. It should be noted that said apparatus can be located at any point along the path taken by the data stream.

The present invention is further directed to a method according to claim 5 which solves the above mentioned second object. The method is suited for measuring the Quality of Experience of an ongoing data session in a communication system whereby said data session is established between a server and a client device using a packet switching communication protocol. According to the present invention the method includes the following steps of i. capturing at least two first timestamps each specifying a time at which a certain data package or a particular data content of said data package has to be processed at the client side,
ii. capturing at least two second timestamps each specifying a time at which the certain data packages are acknowledged at which an acknowledgement package sent by the client device for acknowledging said certain data packets is captured, and
iii. determining the Quality of Experience of the data session from first and second timestamps.

The point of measurement can be located at any point along the path taken by the data packets, including the client device and the server device. The first time-stamps are normally determined by the server side and encoded in the data packets. The timestamps preferably specify a time at which a certain data type or a part of a data packet has to be processed by a defined application, for example a video or audio player, at the client device.

The second timestamp specifies a time at which certain data packet arrived at the client device and is successfully acknowledged by the client. Second timestamps specify the time a respective acknowledgment is received at a point of measurement. In contrast to taking the timestamp at the point of measurement the method according to the invention has the advantage that only those packets are considered that are received by the client, i.e. the method is not sensitive on packet loss.

A comparison of first and second timestamps leads to a reliable predication according to the Quality of Experience of the measured data session.

In a preferred embodiment the network is decided to provide adequate Quality of Experience if the second timestamps are captured with a higher frequency than it is required by the time at which certain data packets have to be processed at the client device.

For the evaluation of the determined Quality of Experience it is particularly advantageous to compare it against a predetermined threshold. For example, if the Quality of Experience drops below the threshold particular measure should be taken involving steps for increasing the Quality of Experience.

In a particular preferred embodiment the step of determining the Quality of Experience includes calculating the ratio between the difference of two captured first timestamps to the difference of two captured second timestamps.

In another preferred embodiment the first timestamps are encoded at the server device and inserted in the transmitted data packet of the data session. The time-stamps can be included in the header of a sent data packet or can alternatively be a part of the inserted data content of the data packet. In both cases, the step of capturing respective first timestamps is advantageously done by deep packet inspection.

It is advantageous to capture second timestamps from a package acknowledgement acknowledging a certain data package. As the point of measurement is commonly situated within the core network, those parts of the network which cause the main contributions to packet delay and packet delay variation are passed by the packet after the time of recording by the measurement device. This is mainly due to queuing which commonly occurs in downlink direction from the measurement device down to the client's device. Generally, downlink direction is heavier loaded by traffic than uplink direction. As acknowledgements are transmitted in uplink direction they are expected to undergo less queuing and therefore give the better timing signal.

It is conceivable that a sequence number preferably identifying a certain data packet sent by the server device is captured together with the first timestamp included in said packet. Preferably, said sequence number is also included in the acknowledgement packet which is related to the respective data packet sent by the server device to the client device and numbered with said sequence number. Therefore, a received acknowledgment sent by the client device can be unambiguously assigned to a captured first timestamp with respect to said sequence number.

Further preferable, the method captures several data packets and acknowledgment packets and stores the respective values in a table row consisting of three columns including the related values for sequence number, first timestamp and second timestamp. Following measurement results are added as additional rows.

The used packet-switching data link is preferably based on the known TCP protocol. In that case, the TCP acknowledge (ACK) Number refers to the TCP data packet which includes the adequate TCP sequence number and the first timestamp.

In a preferred embodiment the ongoing data session transmits one or more frames of a Video- and/or Audio stream from the server device to the client device. In that case, the first timestamp is taken from the playout time of the video or audio frames encoded in the video containers. The playout time specifies the time at which a certain frame has to be processed by the video player at the client device and is encoded in the video containers. Hence, the playout time is compared with the second timestamp that means the time the acknowledgment of the video stream packets is captured. By this it can be decided easily if the arriving video stream is fast enough to meet the timing requirements of the application.

According to the above mentioned embodiment it is conceivable if at least one frame is transported within a certain data package and the first timestamp of said data package is taken from the playout time of the last complete frame included in said data package.

As the actual start time of a video/audio stream is not explicitly part of the transmitted video data, buffering of the received stream at the client's side is not covered here. However, it is possible to estimate buffering time by use of additional parameters provided by most of the video/audio file formats. In one embodiment, the buffering time of the video stream is estimated according to the ISO/IEC 14496-12 standard and is considered for determining the Quality of Experience. In detail, the optional "progressive download information box" (pdin) is specified by said standard (Chapter 8.43.1) and could be taken into account for estimating the video buffering time.

Moreover, the present invention is directed to a device for determining the Quality of Experience in a communication system by processing the above described method. Obviously, the device comprises the same properties and advantages as the described inventive method.

The device is preferably integrated in or connected to an apparatus according to the solution of the first object.

For solving the third mentioned object the present invention is further directed to a video server according to claim 15 comprising:
 a. means for transmitting a first video stream and a second video stream over a packet based network,
 b. means for determining the Quality of Experience of the transmission of the first video stream,
 c. means for comparing the determined Quality of Experience against a predetermined threshold and
 d. means for determining and adjusting the current data rate of the second video stream if the determined Quality of Experience is lower than a predetermined threshold.

According to the present invention the video server comprises means which allow video rate adjustments if the transmitted video image quality does not meet the determined requirements.

The means for determining the Quality of Experience are preferably adapted to process the method according to the invention.

The above mentioned device for processing the method according to the present invention can preferably be integrated in or connected with the video server.

In a preferred embodiment the first and/or the second video stream has/have a variable bit rate. The inventive video server is adapted to adjust the allocated available server bandwidth dependent on the variable bitrates of the first and second streams. To estimate the necessary bandwidth a determination of the actual Quality of Experience is processed.

It is possible to adjust the data rate of said second video rate by limiting the data rate in predetermined graduations.

BRIEF DESCRIPTION OF THE SEVERAL VIEWS OF THE DRAWINGS

Further advantages of the present invention are described on the basis of the figures which show an example application of the invention. It is depicted in FIG. 1: a table containing timing information fields for some of the most popular video file formats and in FIG. 2: a schematic view of processing the inventive measurement method for determining Quality of Experience.

DETAILED DESCRIPTION OF THE INVENTION

Figure 2:
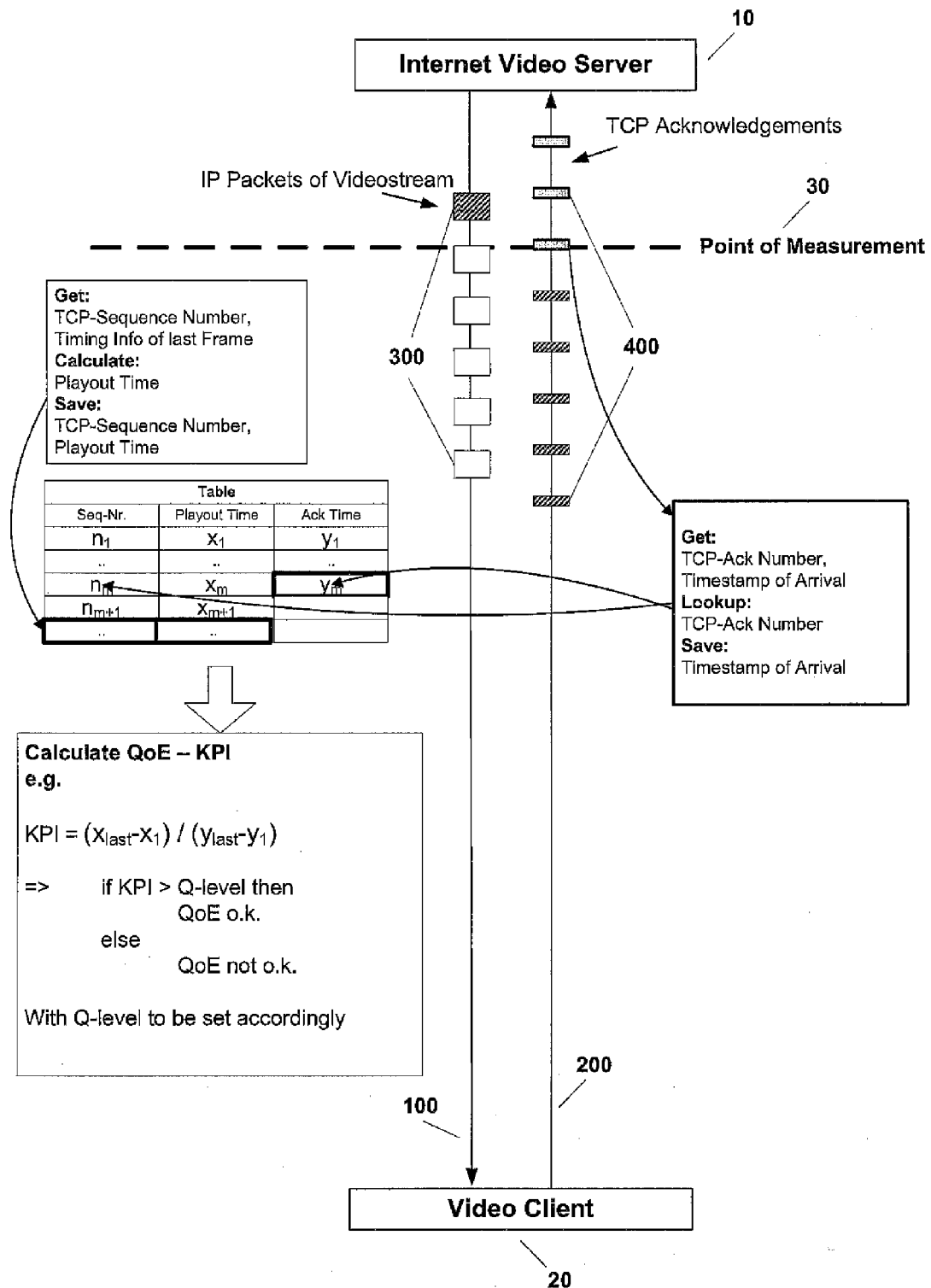

The method according to the invention concentrates on throughput analysis based on the playout times of the individual video frames which are encoded in the transmitted containers. The playout time specifies the time at which a certain frame has to be processed by the video player. Obviously, information on playout time for the individual video stream must be part of all types and variants of video codes. As an example, FIG. 1 shows a table containing timing information fields for some of the most popular video file formats. In some cases, this information has to be processed further by simple operations like calculating playout time stamps from given time intervals between subsequent frames.

As depicted in FIG. 2, the investigated communication system comprises an Internet video server 10 and a video client 20 which are interconnected over a bidirectional TCP connection wherein the downstream from server 10 to client 20 is labelled with reference numeral 100 and the respective upstream path has the reference numeral 200.

The object of the present invention is to determine a value KPI which characterises the Quality of Experience of an arbitrary video stream transmitted over the downlink path 100 from the video server 10 to the video client 20. The video format corresponds to one of the entries of the table in FIG. 1.

A respective measurement device 30 designed to process the inventive method can be installed at any point along the path taken by the video stream in the downlink path 100. In FIG. 2, the device 30 is installed closer to the video server 10.

The packets 300 of the video stream correspond to TCP packets transporting one or more video frames per packet. Each packet comprises a TCP sequence number and timing information of the last frame specifying a time respective video frame should be executed by a video player or a similar application at the video client 20.

The measurement device 30 captures the TCP sequence number together with said timing information of the last frame by Deep Packet Inspection. A playout time x is calculated from said timing information and stored to table 500 in combination with the adequate TCP sequence number n. The index of mentioned variables n, x marks the entries for successive packets.

Device 30 also captures TCP acknowledgements 400 received in the uplink path 200. For each packet included TCP ACK Number is analysed and asserted to the respective acknowledged TCP packet 300 in downstream 100. Determined time-stamp specifies the time the TCP acknowledgement is received at the device 30. Said timestamp y is stored in the last column of table 500. In other words, the device takes the actual timing of video frame transmission by using the time the TCP acknowledgments arrive at the measurement device 30, instead of taking the arrival time of the packet 300 at the client 20 itself.

This has two major advantages:
 Only those packets are considered that are received by the client 20, i.e. the method is not sensitive on packet loss.
 As the point of measurement is commonly situated within the core network, those parts of the network which cause the main contributions to packet delay and packet delay variation are passed by the packet 300 after the time of recording by the measurement device 30. This is mainly due to queuing which commonly occurs in downlink direction 100 from the measurement device 30 down to the client's device 20. Generally, downlink direction 100 is heavier loaded by traffic than uplink direction 200. As TCP acknowledgements 400 are transmitted in uplink direction 200 they are expected to undergo less queuing and therefore give the better timing signal.

The completed measurement procedure can be once again sketched as follows:

1. Store the sequence number n for each TCP packet 300 containing a certain video stream of an identified active video stream.
2. Find the last complete video frame belonging to that video stream within the packet and compute and store the playout time x
3. For each acknowledgement 400 received for a packet 300 belonging to a TCP stream carrying an identified active video stream: search for the playout time x of the corresponding TCP packet 300.
4. If TCP packet 300 was found: store timestamp y of acknowledgement 400 together with playout time x.
5. Compare playout times $x_1, x_{m+1}$ with Ack timestamps $y_1, y_{m+1}$ and calculated the ration KPI between the difference $x_{last}-x_1$ to $y_{last}-y_1$: if the TCP acknowledgements 400 arrive with higher frequency than required by the playout times y of the packets 300, the network is decided to provide adequate streaming QoE.

The measurement method according to the present invention presented here may be used in various contexts, such as:

Support of capacity planning: points of congestion can be identified by detecting QoE degradation. From an economic point of view, this can be more efficient than scanning the utilization of all bandwidth resources within the network, provided that QoE is measured at central network locations and the path of the individual streaming flows through the network can be reconstructed.

Support of customer care: customer complaints can be mapped to QoE measurement results which will improve root cause analysis.

Definition and Monitoring of Video Quality SLAs: the measurement method enables selling of Video Quality to the customers and to Internet service providers.

Traffic management: the measurement results may serve as an input for any kind of traffic management such as bandwidth limitation for packet flows with lower priority in case of congestion.

The invention claimed is:

1. An apparatus for controlling data traffic in a cell of a cellular network, said apparatus comprising:
    a. means for determining the data rate of an ongoing data session established between a first client device located in a cell and a network device wherein said data session is used for receiving streaming data;
    b. means for determining the data rate of an ongoing data session established between a second client device located in the same cell and a network device wherein said data session is used for receiving non-streaming data;
    c. means for determining a Quality of Experience of the data stream of the first client device; and
    d. means for adjusting the data rate of the first and/or second client device if the determined Quality of Experience of said data stream of the first client device is lower than a predetermined threshold.

2. An apparatus according to claim 1, wherein said means for adjusting the data rate is adapted to block and/or delay and/or discard data packets of the respective data stream of the first and/or second client device.

3. The apparatus according to claim 1, wherein the cellular network is based on a standard selected from the group consisting of GSM, GPRS, UMTS, and LTE, and/or the first and/or second client devices is/are mobile devices, such as mobile phones, smartphones, notebooks or tablet PCs.

4. The apparatus according to claim 1, wherein the apparatus is a network controller, a router or a network equipment device.

5. A method for measuring the Quality of Experience of a data session at a measurement point in a communication system comprising at least one client device and at least one server device interconnected over a packet-switching data link, wherein the method comprises:
    i. capturing at least two first timestamps each specifying a time at which a certain data package or a particular content of said data package has to be processed at the client side;
    ii. capturing at least two second timestamps each specifying a time at which an acknowledgement package sent by the client device for acknowledging said certain data packets is captured; and
    iii. determining the Quality of Experience of the data session from said first and second timestamps.

6. The method according to claim 5, wherein the Quality of Experience is compared against a predetermined threshold.

7. The method according to claim 5, wherein the Quality of Experience is determined by the ratio of the difference between two captured first timestamps to the difference between two captured second timestamps.

8. The method according to claim 5, wherein the first timestamps are captured directly from header information of the certain data package or from a particular data content of the data package and/or wherein the second timestamps are captured from a time at which a package acknowledgement acknowledging the certain data packages is arriving at the point of measurement.

9. The method according to claim 5, wherein a sequence number of a certain data package is captured together with its first timestamp and/or wherein the packet-switching data link is based on the TCP protocol.

10. The method according to claim 5, wherein the data session transmits one or more frames of a video and/or audio stream and the first timestamp is a playout time of a certain frame.

11. The method according to claim 10, wherein more than one frame is transported within a certain data package and the first timestamp of said data package is taken from the playout time of the last complete frame of the data package.

12. The method according to claim 10, wherein the buffering time of said video and/or audio stream is estimated, in particular according to the ISO/IEC 14496-12 standard and is considered for determining the Quality of Experience.

13. A device for determining the Quality of Experience in a communication system, the device processing in accordance with a method including the following steps:
    i. capturing at least two first timestamps each specifying a time at which a certain data package or a particular content of said data package has to be processed at the client side;
    ii. capturing at least two second timestamps each specifying a time at which an acknowledgement package sent by the client device for acknowledging said certain data packets is captured; and
    iii. determining the Quality of Experience of the data session from said first and second timestamps.

14. The device according to claim 13, wherein said device is integrated in or connected to an apparatus, said apparatus comprising:
   a. means for determining the data rate of an ongoing data session established between a first client device located in a cell and a network device wherein said data session is used for receiving streaming data;
   b. means for determining the data rate of an ongoing data session established between a second client device located in the same cell and a network device wherein said data session is used for receiving non-streaming data;
   c. means for determining a Quality of Experience of the data stream of the first client device; and
   d. means for adjusting the data rate of the first and/or second client device if the determined Quality of Experience of said data stream of the first client device is lower than a predetermined threshold.

15. A video server for transmitting data streams over a packet based network, comprising:
   a. means for transmitting a first video stream and a second video stream over the packet based network;
   b. means for determining the Quality of Experience of the transmission of the first video stream;
   c. means for comparing the determined Quality of Experience against a predetermined threshold; and
   d. means for determining and adjusting the current data rate of the second video stream if the determined Quality of Experience is lower than a predetermined threshold.

16. The video server according to claim 15, wherein the first and/or the second video stream has/have a variable bit rate.

17. The video server according to claim 15, wherein said means for adjusting the data rate of said second video rate are adapted to limit the data rate in predetermined graduations.

18. The video server according to claim 15, having integrated in or connected to the video server, a device for determining the Quality of Experience in a communication system by processing in accordance with a method including the following steps:
   i. capturing at least two first timestamps each specifying a time at which a certain data package or a particular content of said data package has to be processed at the client side;
   ii. capturing at least two second timestamps each specifying a time at which an acknowledgement package sent by the client device for acknowledging said certain data packets is captured; and
   iii. determining the Quality of Experience of the data session from first and second timestamps.

* * * * *